A. B. PRATT.
NUT.
APPLICATION FILED MAY 9, 1919.

Patented Oct. 11, 1921.

Inventor:
Albert B. Pratt,
by Emery, Booth, Janney & Varney
Attys

UNITED STATES PATENT OFFICE.

ALBERT B. PRATT, OF LYNDON, VERMONT; DAVID E. PORTER ADMINISTRATOR OF SAID ALBERT B. PRATT, DECEASED.

NUT.

1,393,160.      Specification of Letters Patent.      Patented Oct. 11, 1921.

Application filed May 9, 1919. Serial No. 296,041.

*To all whom it may concern:*

Be it known that I, ALBERT B. PRATT, a citizen of the United States, and resident of Lyndon, in the county of Caledonia and State of Vermont, have invented an Improvement in Nuts, of which the following description, in connection with the accompanying drawings, is a specification, like characters on the drawings representing like parts.

This invention relates to nuts and the purpose is to provide a natural nut in more attractive and merchantable form.

My invention will best be understood by reference to the following description taken in connection with the accompanying drawings disclosing an illustrative embodiment of my invention wherein.

My invention is applicable generally to hard-shelled nuts which may not easily be opened with the fingers and in its more specific aspects to nuts having a kernel formed in a plurality of meats. As an example I may mention an English walnut and as I anticipate a major field of utility for my invention in connection with English walnuts, I herein specifically disclose and describe such a nut.

In accordance with my invention, the nut is so prepared that it may be readily opened with the fingers with the same facility as the ordinary peanut and furthermore, in such manner that the meats are secured whole and without breakage. Other advantages are obtained which will be more clearly understood as the description proceeds.

Figure 1:
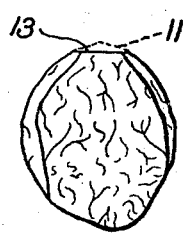
Figures 1, 2 and 3 are elevations illustrating diagrammatically successive steps in the preparation of an English walnut.
Figure 2:
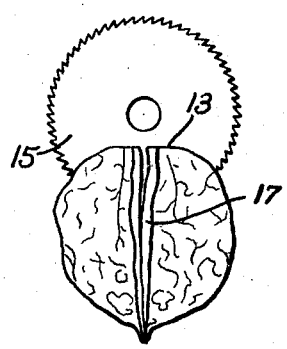
Figure 3:
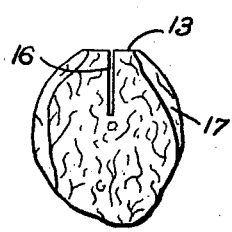
Figure 6:
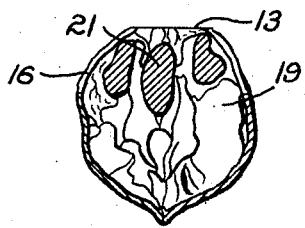
Fig. 6 is an elevation of a half of the nut after it has been split open.
Figure 4:
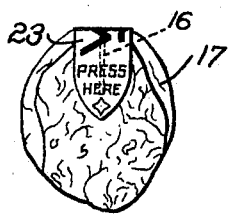
Fig. 4 is an elevation of the completed product.

Referring to Figs. 1, 2 and 3, I prepare the walnut 9 preferably by first cutting off the extreme portion 11 at one end, preferably the stem end, thus at once getting rid of the hardest portion of the shell and providing a flattened surface, shown at 13 in Fig. 2, which has an advantage hereafter to appear, and also facilitating the next operation shown diagrammatically in Fig. 2. As shown in Fig. 2, I next kerf the end of the nut, this operation being indicated in Fig. 2 by the representation of a circular saw 15, although the cutting may be accomplished in any desired manner. In the case of the walnut, the kerf 16 is made transversely to the meeting plane 17 of the two halves of the bivalve shell and is carried down a suitable distance to weaken the shell. The kerf is thus placed at the meeting plane between the two meats of the nut substantially at the husk 19, shown in Fig. 6, which separates them; and the cutting, particularly if started from the stem end, will sever the connecting portion 21 between the two meats which extends through the central part of this husk adjacent the stem end.

To open a nut prepared in this manner, it is necessary only to press the nut with the fingers on the sides adjacent the bottom of the kerf. The weakened shell will readily break the rest of the way and the nut will separate easily into two halves in each of which will lie a complete meat formed of two of the natural quarters of the kernel which will have been separated from the other meat by the severance of the connecting portion referred to above. In cracking walnuts in the ordinary manner it is the exception that whole meats are obtained, this being due not only to direct breaking up of the meats due to the smashing operation in cracking, but to the breaking of the connection between them which does not take place exactly at the joint of the meats.

When the nut is split open as described, the shell is, as it were, quartered since the two halves into which it breaks are naturally divided at 17, so that the portions of the shell may be stripped therefrom somewhat in the manner in which an orange is peeled. Thus, if the breakage is not complete or clean the shell may still be detached from the kernels without breaking the meats and the meat may be removed from the half shell in a convenient manner by separating this half shell into quarters.

Figure 5:
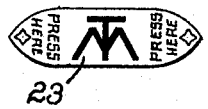
Fig. 5 is a plan of the label shown in Fig. 4.

To prepare the nuts for marketing and to prevent the access of dirt, the kerf 16 may be closed, conveniently by a label 23 of paper or other fibrous material which may be adhesively secured, the flattened portion 13 shown in Fig. 2 facilitating the application of the label. This label, if desired, may bear any suitable trade-mark, as indicated in Fig. 5 by the monogram of the letters T M, or any other desired printed matter. For example, the nuts might be used as a novel means of distributing advertising. Preferably also, the label is provided with suitable legends, as shown at the ends thereof in Fig. 5, which will indicate the manner in which pressure should be applied to the nut to open the same.

The label 23 is conveniently secured in position by a suitable adhesive and for this purpose I prefer to use a preparation of sugar, by which word I include invert sugars such as glucose. The adhesive composition may be in the nature of the normal hard, chewy candies prepared by boiling glucose preparations in the manner already known and this composition may be applied when warm to the end of the nut and, if desired, in such quantity as to itself seal the kerf, but preferably also as an adhesive for securing a label 23, as already described. The use of such a material will in no way detract from the edibility of the nut kernel and will compensate for the loss in weight occasioned by the kerfing of the nut.

The pressure applied to the nut to open the same puckers the paper or other material of which the label 23 is prepared and splits the same in such manner that it offers no substantial resistance to the opening of the nut.

Figure 7:
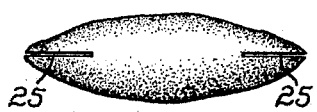
Fig. 7 is a side view of a pecan illustrating a modification.
Figure 8:
Fig. 8 is an end view of Fig. 7.

In Figs. 7 and 8 I have shown a nut in which two intersecting kerfs 25 and 27 (see Fig. 8) are cut across the end and, as shown in Fig. 7, both ends of the nut are thus treated. Obviously within the scope of my invention I may kerf either or both ends of the nut and may provide as many kerfs as may be desired sufficiently to weaken the shell.

Having thus described my invention, what I claim as new and desire to secure by Letters Patent I shall express in the following claims:—

1. A hard shelled nut of the type having a double meat kerfed substantially at the meeting plane of the meats.

2. A hard shelled nut of the type having a double meat kerfed substantially at the meeting plane of the meats and having the connection between the meats severed.

3. A hard shelled nut of the type having a bivalve shell kerfed transversely of the line of junction of the shells.

4. A walnut or similar nut kerfed across the base end.

5. A hard shelled nut kerfed across an end thereof, the kerfing sufficient to permit ready opening of the nut, but insufficient to cause the nut to fall apart without the application of substantial force.

6. A hard shelled nut having at least one kerf across each end thereof.

7. A nut kerfed across the end and having a covering adhesively applied over the kerf.

8. A nut kerfed across the end and having a sheet secured over the kerf by a sweet, edible adhesive.

9. A nut kerfed across the end and having a label sealing the kerf provided with an indication of the manner of applying opening pressure to the nut.

10. An unshelled nut of the type having a divided or substantially divided kernel, in which the partition between the parts of the kernel is cut along a central longitudinal plane.

11. The method of preparing nuts for the removal of the meat therefrom, which comprises sawing a kerf in a central longitudinal plane across at least one end of the nut.

In testimony whereof, I have signed my name to this specification.

ALBERT B. PRATT.